3,803,328
Patented Apr. 9, 1974

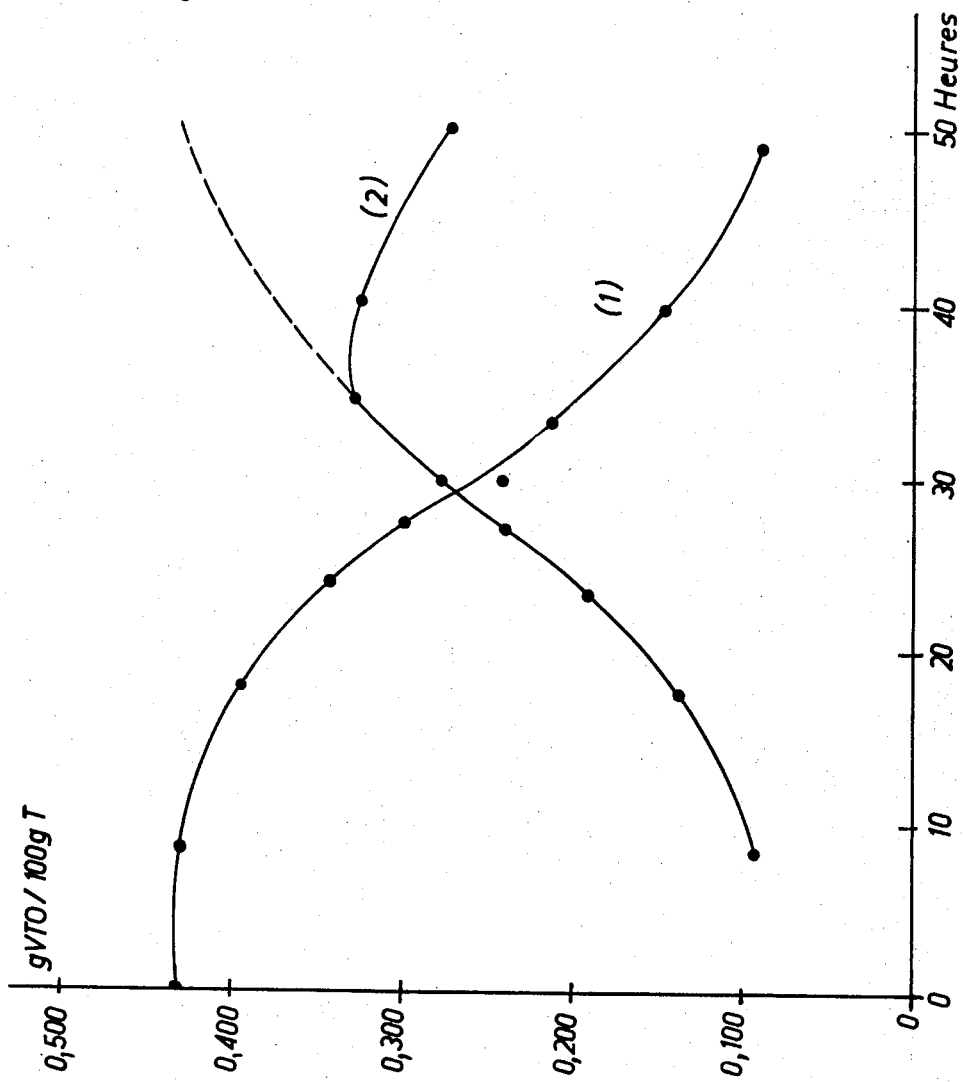

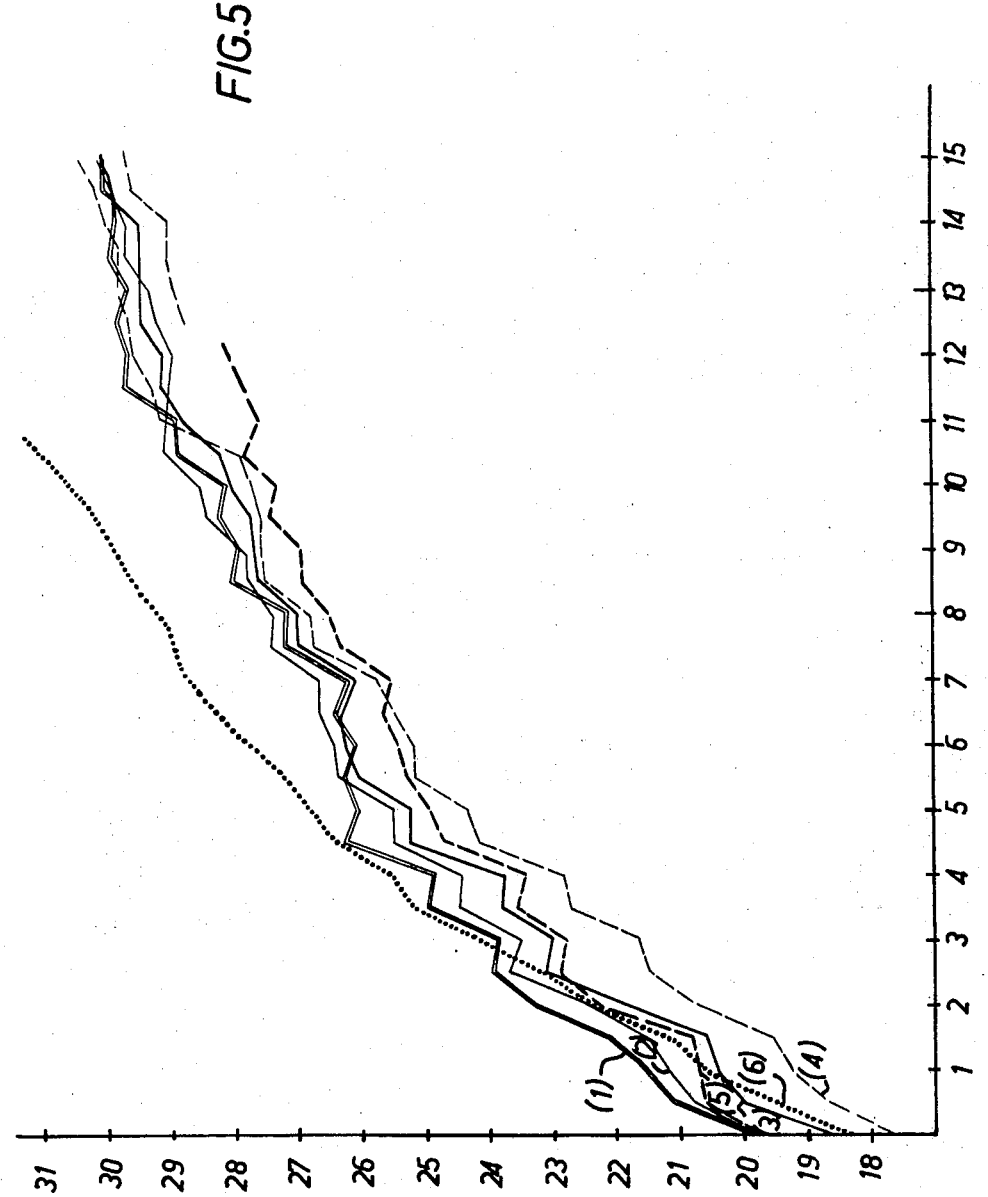

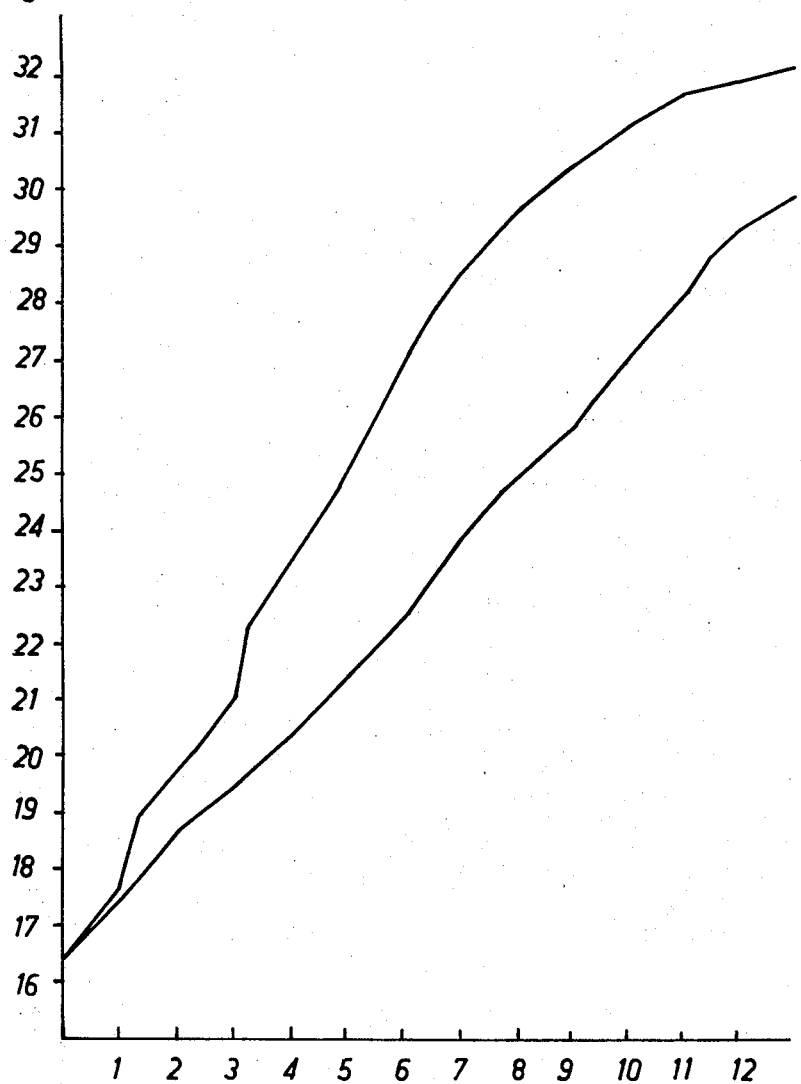

3,803,328
PROCESS FOR IMPROVING THE VALUE OF CAKES OF VEGETABLE ORIGIN, NOTABLY TO OBTAIN PROTEINS
Thadee Joseph Staron, Noisy-le-Roi, Yvelines, France, assignor to Etablissement Public: Institut National de la Recherche Agronomique, Paris, France
Filed Mar. 15, 1971, Ser. No. 124,132
Int. Cl. A23l 1/20
U.S. Cl. 426—44                    14 Claims

ABSTRACT OF THE DISCLOSURE

A process for improving the value of cakes of vegetable origin is described. The crude cakes are macerated in an aqueous medium with strains of microorganisms, notably the yeast *Geotrichum candidum*. The cakes are thus freed from the sulphur-containing impurities and aflatoxins which contaminate them and limit their use at present. The cakes obtained have an improved nutritive value. New, pure proteins can be isolated from the maceration liquids by precipitation to the isoelectric pH or in the presence of saline solution.

---

Figure 1:
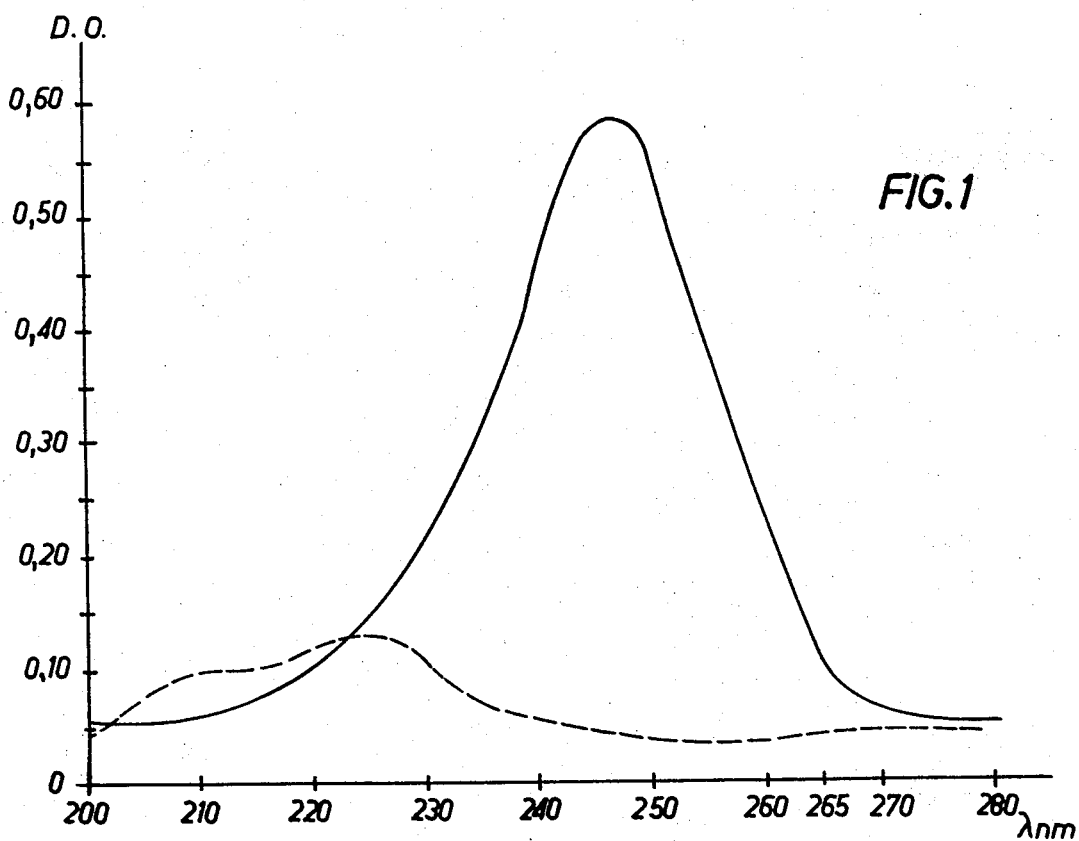

The invention relates to the treatment of cakes made from seeds of vegetable origin. It notably relates to a process permitting such cakes to be detoxicated and improving their value by biological means notably to obtain proteins.

Numerous vegetable cakes are available at present, but their potential nutritive value is badly exploited. Furthermore, in certain cases, contaminants, particularly sulpuhr containing products, such as isothiocyanates, as well as aflatoxins, pollute cakes, such as colza and groundnut cakes. It is thus known that the presence of sulphur-containing products, and notably thioglycosides in colza cakes is at the origin of numerous physiological disorders observed in animals fed with said cakes. The bad effects, particularly the carcinogenic effects, of aflatoxins found in groundnut cakes and which are heterocyclic compounds excreted by fungi (*Penicillium aspergillus*) are also known.

Among the processes which have already been proposed to remove sulphur containing products from colza cakes may be mentioned the technique known as toasting, distillation, steam stripping, extraction with solvents and treatment with salts of heavy metals, but none of these processes has been shown to be really effective. The use of groundnut cakes poses the same feeding problems as that of colza cake when they are polluted by aflatoxins. Moreover, the protein balance of many cakes made from vegetable seeds is unsatisfactory. In particular; the nitrogen efficiency of the proteins of cakes, such as soya cakes, is not always sufficient to render them fit for consumption by animals, and, a fortiori, by man.

The object of the invention is a process for treating cakes made from vegetable seeds which eliminates the drawbacks of the prior art.

The object of the invention is, thus, a process for detoxicating such cakes by biological means.

Another object of the invention is a process for improving the nutritive efficiency of such cakes by means of biological treatment.

Another object of the invention is the cakes obtained by such a process.

A further object of the invention is the new proteins obtained from said cakes by biological means, the said proteins being pure and being suited to human and animal feeding.

Generally speaking, the object of the invention is, therefore, a process for treating cakes made from vegetable seeds in which the said cakes are subjected, under conditions of maceration, to the action of at least one microorganism selected from bacteria, yeasts and fungi.

During the work leading up to the present invention, qualitative trials were undertaken on a large number of cakes made from vegetable seeds and on more than a thousand microorganisms. Up to the present, the most satisfactory results for operation on an industrial scale have been obtained with a yeast belonging to the species *Geotrichum candidum*. This microorganism will be described in greater detail in the following.

From a specific point of view, which is preferred, the object of the invention is, therefore, a process for treating cakes made of vegetable seeds in which the said cakes are subjected, under maceration conditions, to the action of the yeast *Geotrichum candidum*.

The cakes to which the process of the invention can be applied are made from seeds of any vegetable origin. Colza, rape, groundnut, sunflower, soya, sesame, castor oil, cotton vinia sinensis, broad bean (*Faba vulgaris*) and other vegetable seeds can, notably be mentioned.

It will be noted that the process of the invention is applied to cakes as they are available on the market. It is, therefore, necessary to stress this difference from certain prior fermentation techniques which were used on diluted juices or liquors obtained from vegetable seeds, such as groundnut. The invention, on the contrary, suggests a maceration process applied to crude cake.

Within the meaning of the present description, the words "maceration conditions" relates to a treatment consisting in placing cake in intimate contact with strains of the selected microorganism, the said treatment being carried out in an aqueous medium.

The usual macreation conditions imply a temperature slightly higher than ordinary temperature, in the range of 30 to 45° C. for example. With *Geotrichum candidum* the best results are obtained with maceration temperatures in the range of 37 to 40° C.

The pH of the maceration medium varies during the operation, but it generally remains between about 4 and 6.5. The pH is at its highest value at the start and it decreases during the treatment.

The length of treatment varies with the temperature, but it also depends on the results desired and other factors, such as the volume of the soaking tanks. With *Geotrichum candidum*, for example, sulphur containing products are completely eliminated in between 30 and 40 h. at 30° C., and this length of time falls below 30 h. if the operation is carried out under the same conditions, but at 37 to 40° C. To obtain total extraction of cake proteins and to isolate them as pure proteins, the treatment should be carried out under the same temperature for a period of about 60–90 h.

Maceration is carried out under stationary or stirred conditions with or without ventilation.

Another advantageous characteristic of the invention is that the maceration does not necessitate preliminary sterilization. Contacting of the microorganism culture and the vegetable cake is thus very easy to effect.

After maceration, the entire product is atomized, or the treated lump of cake is recovered by being separated from the maceration liquids. The value of the lump can then be improved to be sold in powdered form. The maceration liquids are treated consecutively to isolate therefrom the pure proteins which have been rendered soluble during maceration. The protein fractions are isolated by isoelectric pH precipitation or by the addition of aqueous solutions of mineral salts of variable concentration, such as ammonium sulphate or by solvents (ethanol, methanol).

The invention will now be illustrated by the detailed description which follows:

I. Characteristics of the microorganism used (*Geotrichum candidum*)

(1) Morphology and biology.—Seen under the microscope, the mycelium is white, branched and with frequent divisions. There are no conidiophores. The conidia are monocellular, have not conceptacles, globulous, cylindrical, short and straight, they are formed by the segmentation of the mycelium (*Arthrosporous conidia*). Their mean size is 3–6 x 6–12μ. The above characteristics enable the microorganism to be classified in the species Geotrichum candidum Link ex Persoon.

This fungus grows well on most of the usual media (Sabouraud, Czapek, nutritive potato, peptone) but it grows most luxuriantly on a Sauton medium. This strain is very polyphagous; it metabolizes all carbohydrates, and all nitrogen forms (nitric, ammonia, ureic, amine, protein, pyrimidine, purine, puric nitrogen). However, puric bases provided the best yields of proteins.

(2) Culture medium and conditions.—The strain is preserved on a solid Sauton medium.

Starting ferments for fermentation are obtained on a culture medium preferably consisting of:

(a) An inorganic solution of pH 6.8 ($KH_2PO_4$:1 g.; $MgSO_4$, $7H_2O$:0.5 g.; KCl:0.2 g.; $CaCl_2$:0.2 g.; $FeSO_4$, $7H_2O$:0.03 g.; $ZnSO_4$, $7H_2O$:0.01 g.; $CuSO_4$, $5H_2O$:2 mg.; distilled water q.s.p. 100 ml.);
(b) Glucose 35 g./l.;
(c) Uric acid 5 g./l. or urea 4 g./l.

This medium is divided betwen 500 ml. erlenmeyer flasks in amounts of 100 ml. per erlenmeyer flask and then sterilized for 15 min. at 110° C.

Seeding is carried out in a sterile manner with an aqueous suspension of a 5-day old culture of *Geotrichum candidum* obtained on a Sauton medium.

Culturing is carried out on a rotating stirrer (130 revolutions/min.) at 30° C.; it lasts for 48 h.

Carried out in a fermentor, culturing is usually finished in about 20 h.

II. Testing methods

Freeing of 5-vinylthiooxazolidone, abbreviated to VTO, selected as the compound representative of thioglycosides in the macerating liquid and the residual content of this substance in the insoluble cake, are tested as follows:

(a) Obtaining an enzymatic preparation of myrosinase. It has been shown that white mustard flour with the oil removed gives results comparable with the myrosinase solution. Consequently the said flour is used for practical requirements and in trials. This characteristic is illustrated in FIG. 1 which is a graph obtained with a colza cake showing the absorption curve of VTO (solid lines) as well as the absorption curve of mustard flour (dotted lines), the optical density being given in ordinates and the wave length λ in nm. being given in abscissa.

The seeds of white mustard trialba are finely ground and their oil is removed three times over by 5 volumes of petroleum ether, dried at laboratory temperature and stored in a freezer at −20° C.

(b) Enzymatic reaction. In a 500 ml. Erlenmeyer flask, 2 g. of the cake to be analyzed and 0.2 g. of the mustard with the oil removed are weighed, then 100 ml. of phosphate buffer of pH 7 ($Na_2HPO_4$, $12H_2O$ at 23.08 g./l =400 ml.; $KH_2PO_4$ at 9.07 g./l=600 ml. are added. It is incubated with stirring at 30° C. for 2 h.

(c) Extraction and determination of VTO. The enzymatic reaction being ended, the solution is filtered through paper; 1 ml. of it is extracted twice over with 10 ml. sulphuric ether. The ethereal fractions are combined, made up to 25 ml. filtered on cotton wool and determined with a spectrophotometer (peak of the VTO at 248 nm.).

The absorption is measured at 225, 248 and 265 nm. and the corrected optical density is calculated by subtracting the mean of the values at 225 and 265 from the value at 248 nm. The difference obtained is inscribed on the Wetter standard curve (FIG. 2) to obtain the VTO content X in mcg./ml.

The VTO content in g. per 100 g. of cake is determined according to the following equation:

$$\frac{0.25 X}{M}$$

wherein M is the mass of the trial sample in g.

Figure 2:
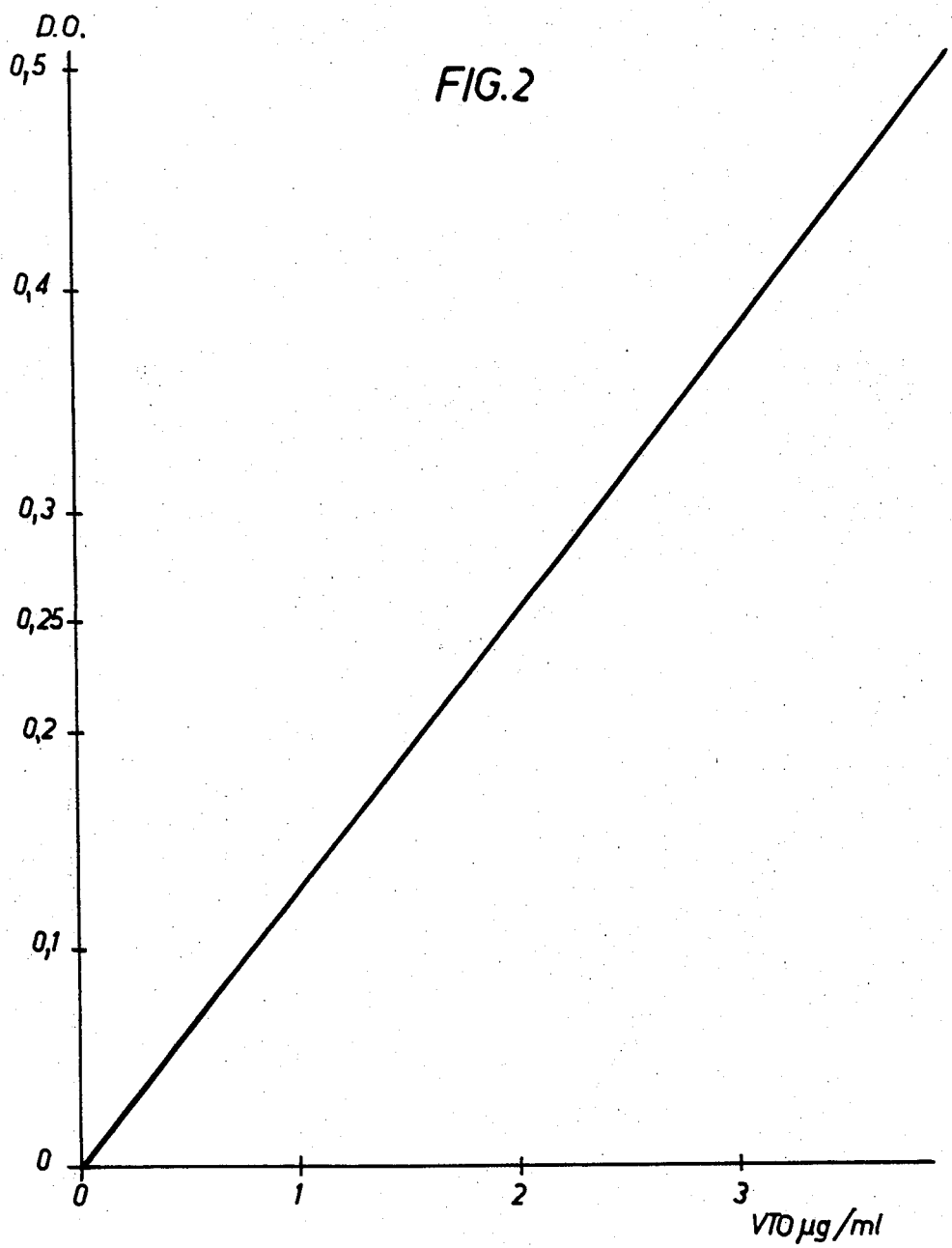

FIG. 2 shows the Wetter standard curve which is known in this technique. The straight line of the graph represents the values of the optical density shown in ordinates as a function of the values of the concentration of VTO, expressed in μg./ml. and shown in abscissa.

EXAMPLE I

This very complete example relates to colza cake.

(A) Maceration method and results obtained

Maceration of the colza cake was carried out in a 40 l. pilot fermenter according to the following formulation:

| | |
|---|---|
| Colza cake | kg.__ 6 |
| *Geotrichum candidum* culture | l.__ 5 |
| Tap water | l.__ 19 |

Figure 3:
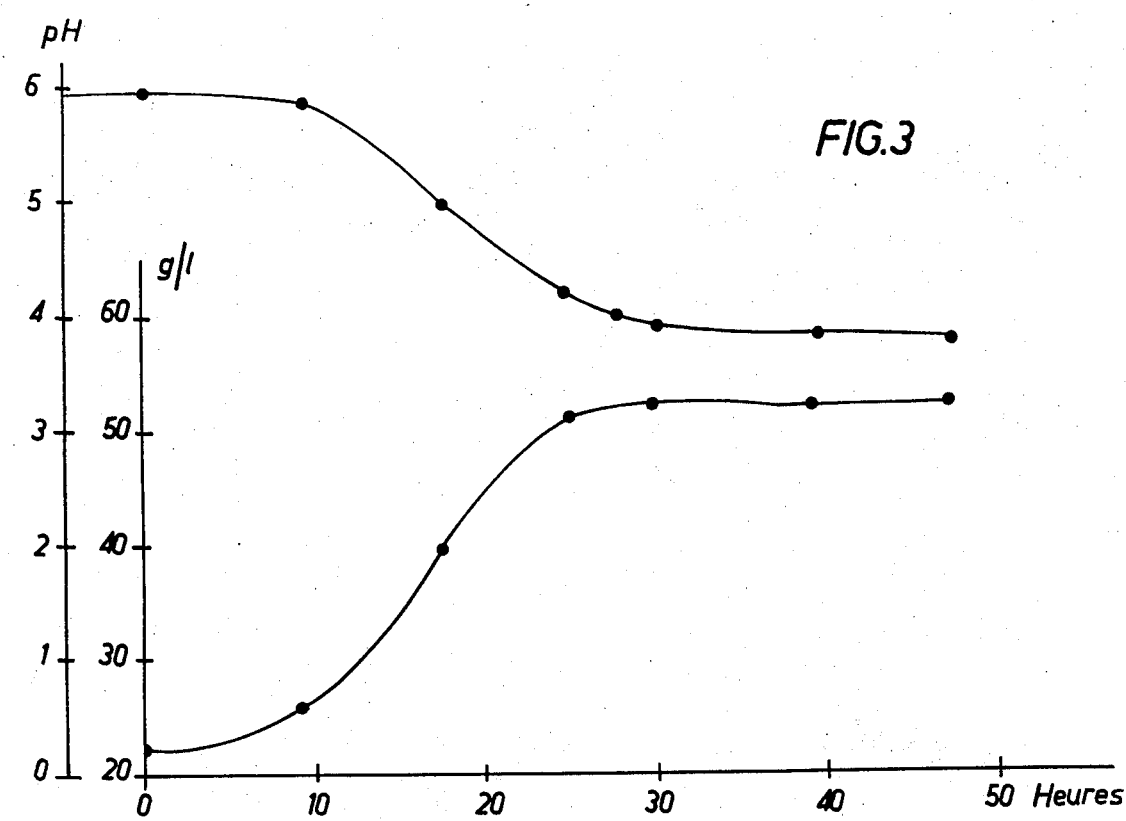

Starting pH=6.4; pH at extraction=4. This lowering of the pH is essentially due to the freeing of proteins in the culture liquids. FIG. 3 is a graph in ordinates on which is shown, on the one hand, the pH and, on the other, the amount of proteins in g./l. in the maceration supernatant, as a function of the duration of maceration shown in abscissa (hours). The upper curve shows the variation of the pH during maceration and the lower curve shows the freeing of proteins from the cake into the maceration liquid.

Culturing is carried out with slow stirring, or by a stationary technique, for 30 to 60 h. at 37° C. without preliminary sterilization. Indeed, preliminary trials have shown that under the conditions described no contamination has ever occurred. Furthermore, stirring the medium and ventilation do not appear to be necessary when small amounts are macerated.

Test portions permit the freeing of VTO in the maceration liquids and its progressive breakdown to be checked. FIG. 4 is a graph showing the freeing and breakdown of the VTO of colza cake due to the action of *Geotrichum candidum*. The amount of VTO is given in ordinates and is expressed in g./100 g. of colza cake. The maceration time, expressed in hours, is given in abscissa. Curve (1) shows the results obtained at a temperature of 37° C. and curve (2) corresponds to the results obtained at 27° C. The increase in temperature is seen to have a surprising effect. At 27° C., hydrolysis of thioglycosides occurs in a first time and it is only after 35 h. culturing that isothiocyanates breakdown starts, and they are only completely destroyed after 85 h. maceration. At 37° C., on the other hand, hydrolysis of thioglycosides and breakdown of the isothiocyanates formed occur simultaneously.

During maceration, the *Geotrichum candidum* progressively solubilizes the colza cake proteins. Thus, when maceration is carried out for 60 to 80 h. at 37° C., 90% of the proteins are dissolved. During the first 30 h. there are freed: a heteroprotein toxic to the mouse (protein α) and a protein containing large amounts of glutamic acid, proline, lysine and sulphurized amino acids (protein β). After 35 h. protein α is observed to disappear and soluble fractions are freed with an amino acid composition very similar to that of total colza cake (see table below).

Fractions so obtained can easily be leached out by conventional chemical methods and contain between 65 and 80% proteins.

(B) Recovery and modes of treatment of macerated colza cake

Macerated cake was treated in various ways:

(a) Recovery of the entire macerated mass and evaporation of water by atomization.
(b) Isolation of the insoluble fraction by centrifugation and drying.
(c) Separation of the soluble fraction and drying.
(d) Fractionation of the soluble fraction by $SO_4(NH_4)_2$.

Operating under these conditions it is possible to distinguish the following fractions:

(1) Total macerated colza cake
(2) Macerated colza cake, insoluble fraction
(3) Macerated colza cake total soluble fraction
(4) Protein α which precipitates by the addition of 20% $SO_4(NH_4)_2$ by weight per volume
(5) Protein β which precipitates with 40% $SO_4(NH_4)_2$ $SO_4(NH_4)_2$ by weight per volume (C) Comparative study of the amino acid composition of the proteins in the various fractions obtained Proteins are determined after mineralization by the Kjeldahl method. The amino acids are analyzed with a "Technicon" autoanalyser, after hydrolysis of the proteins in a sealed tube in HCl 6 N for 24 and 48 h. at 115° C.; tryptophan was determined after alkaline hydrolysis. The results obtained are given in Table I below.

Table I below shows that Geotrichum candidum does not damage the composition of proteins in the colza cake during maceration; on the other hand, it progressively frees protein fractions with a variable amino acid composition.

Protein β, rich in glutamic acid, proline, lysine, histidine and sulphurized amino acids, represents 25% of the total proteins.

The cellulose content increases in the insoluble fraction during maceration because this element is not attacked, but it can, however, easily be removed.

During maceration, the cake is found to lose about 10% of its weight; this occurs essentially to the detriment of carbohydrates.

Table I above shows that maceration with Geotrichum candidum causes colza cake to become richer in most of the indispensable amino acids, which explains its good protein efficiency.

As has been mentioned, protein β can be isolated from the fermentation liquids in the following manner:

20% (w./v.) of $(NH_4)_2SO_4$ is added to the fermentation liquids; the precipitate obtained is removed; 20% (w./v.) of $(NH_4)_2SO_4$ is added to the supernatant and this second precipitate is collected by centrifugation; it is solubilized in a minimum of distilled water, dialized and freeze-dried. About 17 g. of protein per liter of maceration liquid is thus obtained.

This fraction is water soluble, it contains 100% protein, it has an ultraviolet absorption spectrum (peak at 225 mμ); it is homogeneous with electrophoresis and migrates towards the anode, its isoelectric pH is 12.2.

With hydrochloric hydrolysis, this protein frees all the amino acids (see Table I) and is characterized by high glutamic acid and proline contents.

This molecule has the property of precipitating certain natural polymers such as polyuronides and nucleic acids.

(D) Nutritional experiment on the mouse

Tests on the food value of macerated cake were carried out on the mouse.

180 female mice were divided into 6 lots of 30 mice. The control feed was that commonly used. In the other 5 feeds tested, the groundnut and soya cake were replaced by the colza cakes to be experimented.

TABLE I

| | Percent by dry weight | | | | |
|---|---|---|---|---|---|
| | Colza cake control | Total atomized macerated colza cake | Macerated colza cake insoluble fraction | Macerated colza cake, total soluble fraction | Protein β |
| Protein content | 35.3 | 45.2 | Variable | 64 | 10 |
| Aspartic acid | 7.0 | 6.9 | 7.0 | 7.0 | 2.4 |
| Threonine | 4.3 | 4.5 | 4.5 | 4.0 | 3.0 |
| Serine | 4.3 | 4.2 | 3.8 | 4.4 | 3.2 |
| Glutamic acid | 18.3 | 18.7 | 17.0 | 19.2 | 26.0 |
| Proline | 7.4 | 7.1 | 7.3 | 7.2 | 9.2 |
| Glycine | 5.2 | 5.2 | 5.3 | 5.2 | 4.1 |
| Alanine | 4.2 | 4.9 | 5.0 | 5.2 | 3.8 |
| Valine | 4.7 | 4.9 | 5.1 | 4.8 | 3.9 |
| Cystine | 2.6 | 2.7 | 2.3 | 3.2 | 4.8 |
| Methionine | 1.9 | 2.0 | 1.6 | 2.1 | 2.4 |
| Isoleucine | 4.6 | 4.5 | 4.6 | 4.3 | 3.2 |
| Leucine | 7.0 | 6.9 | 7.1 | 7.3 | 6.1 |
| Tyrosine | 2.5 | 2.6 | 3.1 | 2.9 | 1.4 |
| Phenylalanine | 4.2 | 4.0 | 4.1 | 3.9 | 2.8 |
| Ammonia/liquor | 1.8 | 1.7 | 1.6 | 1.6 | 2.3 |
| Lysine | 5.3 | 5.6 | 5.1 | 6.1 | 6.8 |
| Histidine | 2.7 | 2.9 | 3.0 | 3.2 | 3.5 |
| Arginine | 6.5 | 6.6 | 6.8 | 6.6 | 5.6 |
| Tryptophan | 1.2 | | | | 0.9 |
| Cellulose | 14 | 17 | Variable | 2 | 0 |

Table II hereinbelow gives the compositions of the feeds used.

TABLE II

| Feed number | 1[1] | 2 | 3 | 4 | 5 | 6 |
|---|---|---|---|---|---|---|
| Constituents, percent: | | | | | | |
| Barley | 10 | 8 | 9 | 9.5 | 9 | 11 |
| Oats | 15 | 12 | 13.4 | 14 | 14 | 16 |
| Wheat | 22 | 18 | 19.5 | 20.8 | 18.4 | 22 |
| Maize | 20 | 16.5 | 18 | 18.8 | 20.3 | 21.5 |
| Groundnut cake | 6.5 | 0 | 0 | 0 | 0 | 0 |
| Soya cake | 15 | 0 | 0 | 0 | 0 | 0 |
| Colza cake | 0 | 34 | 0 | 0 | 0 | 0 |
| Polish colza cake | 0 | 0 | 28.6 | 0 | 0 | 0 |
| Total atomized macerated colza cake | 0 | 0 | 0 | 25.4 | 0 | 0 |
| Macerated colza cake plus reincorporated α protein and free VTO | 0 | 0 | 0 | 0 | 26.8 | 0 |
| Macerated colza cake total soluble fraction | 0 | 0 | 0 | 0 | 0 | 18 |
| Norwegian fish flour | 3 | 3 | 3 | 3 | 3 | 3 |
| Yeast | 0.5 | 0.5 | 0.5 | 0.5 | 0.5 | 0.5 |
| Powdered milk prepared by atomization | 6 | 6 | 6 | 6 | 6 | 6 |
| Mineral and vitamin additions | 2 | 2 | 2 | 2 | 2 | 2 |
| Percent of total proteins | 21.83 | 21.20 | 21.04 | 21.39 | 21.25 | 21.53 |
| Thioglycosides content (expressed in VTO), mg./g | 0 | 1.6 | 0 | 0 | 0 | 0 |
| Free VTO content, mg./g | 0 | 0 | 0 | 0 | 0.8 | 0 |
| Weight gain per mouse in g | 10.2 | 10.14 | 11.04 | 12.8 | | 14.2 |

[1] Control.

The experiment was carried out from June 16 to Oct. 2, 1969. The mice were weighed twice a week. FIG. 5 shows the growth curve of each lot. In FIG. 5, the weight of the mice in g. is shown in ordinates, and the duration of the experiment in weeks is shown in abscissa. The reference curves (1), (2), (3), (4), (5) and (6) correspond respectively to the control feed and feeds No. 2, No. 3, No. 4, No. 5 and No. 6 defined in Table II.

This nutritional experiment shows that the toxicity of colza cake is not manifested by weight symptoms.

Polish colza cake gives good growth. As to macerated feed (No. 5) in which the protein α and free VTO were incorporated, it is very markedly toxic, and the experiment therefore had to be cut short. Feed No. 4 made of macerated colza cake, totally atomized, and feed No. 6 containing colza cake, total soluble fraction, gave higher growth rates than all the other feeds.

As the mice in lot No. 5 showed symptoms of capillary weakness (bleeding of ears and muzle), 15 of them were killed on September 9, with 10 control mice. From this date onward the 15 remaining mice in lot No. 5 were fed with feed No. 4; the above-mentioned symptoms disappeared and the gain in weight per mouse was 9.83 g. on October 3.

The mice of lot No. 1 (control) killed the 9/9 and the mice killed on October 3 and dissected to obtain the following tissues and organs; brain, heart, lungs, kidneys, spleen, liver, stomach, intestines, muscles, skin and fur, bone. The dry weight, free amino acids content, total protein content and total phosphorus content were determined on each of these samples. The results are gathered in Table III hereinbelow (see Table III, below).

The largest weight increases were obtained with feed No. 6; this result appears to be due to a better balance in amino acids of the total soluble fraction and to its low cellulose content (see Table I).

(E) Analysis carried out on tissues and organs

Mice subjected to the experiments described in paragraph (D) hereinabove were killed on October 3 and dissected to obtain the following tissues and organs; brain, heart, lungs, kidneys, spleen, liver, stomach, intestines, muscles, skin and fur, bone.

Analysis of Table III hereinafter reveals the following differences:

The levels of dry matter remain practically constant in all the organs and tissues in the 6 lots; with the exception of the muscles of lot No. 5 which were richer in fats.

Free amino acids are found in larger amounts in all the organs of lot No. 5, which reflects a disturbance of metabolism at this level.

TABLE III

| | Mice of lot No. 1 (control) killed the 9/9 | | | | Mice receiving feed No. 1 (control) killed the 3/10 | | | | Mice receiving feed No. 2 (lot No. 2) | | | | Mice receiving feed No. 3 (lot No.3) | | | |
|---|---|---|---|---|---|---|---|---|---|---|---|---|---|---|---|---|
| | Percent dry matter (D.M.) | Mg. of free amino acids per g. of D.M. | Percent proteins D.M. | Percent total phosphorus D.M. | Percent D.M. | Mg. of free amino acids per g. of D.M. | Percent proteins D.M. | Percent total phosphorus D.M. | Percent D.M. | Mg. of free amino acids per g. of D.M. | Percent proteins D.M. | Percent total phosphorus D.M. | Percent D.M. | Mg. of free amino acids per g. of D.M. | Percent proteins D.M. | Percent total phosphorus D.M. |
| Livers | 27.1 | 6.2 | 64 | 1.1 | 27.81 | 6.4 | 65 | 1.2 | 24.3 | 8.7 | 67.8 | 0.98 | 25.9 | 6.6 | 66.2 | 0.89 |
| Spleens | 22.2 | 5.3 | 73.8 | 1.9 | 22.25 | 5.7 | 72 | 1.75 | 21.3 | 6.3 | 79.5 | 1.65 | 22.8 | 5.8 | 75 | 1.51 |
| Kidneys | 22.5 | 5 | 57 | 0.9 | 26.2 | 4.5 | 59.5 | 0.82 | 23 | 6.9 | 65 | 0.88 | 23.7 | 6 | 38.6 | 0.81 |
| Brains | 19.5 | 7.3 | 54.5 | 1.29 | 19.6 | 7.15 | 55.5 | 1.37 | 18 | 8.5 | 59.8 | 1.34 | 17.5 | 10 | 56.3 | 1.3 |
| Intestines | 20.2 | 13.2 | 70.2 | 1.4 | 20.25 | 13.8 | 67.5 | 1.4 | 19 | 15 | 74.8 | 1.42 | 20.8 | 17.2 | 72.5 | 1.37 |
| Skins and fur | 50.8 | 2.1 | 45.8 | 0.19 | 61 | 2.07 | 45.4 | 0.17 | 49.5 | 2.3 | 46.9 | 0.18 | 51.35 | 1.9 | 44.5 | 0.61 |
| Muscles | 27.2 | 4 | 60.7 | 0.75 | 27.5 | 3.8 | 60.6 | 0.73 | 29.4 | 3.6 | 56.5 | 0.70 | 29.85 | 3.5 | 56.3 | 0.63 |
| Bones | 42.2 | 2.2 | 45.7 | 8.3 | 43.5 | 2.1 | 48.6 | 8.15 | 42.4 | 2.1 | 46.5 | 6.6 | 40.2 | 2.3 | 43 | 7 |
| Lungs | 20 | 5.7 | 64.8 | 0.90 | 20 | 5.4 | 65 | 0.92 | 18.6 | 5.8 | 69 | 0.85 | 20.1 | 5.9 | 65.5 | 0.85 |
| Hearts | 21.6 | 5.8 | 69.8 | 0.80 | 21.8 | 5.6 | 69.5 | 0.78 | 21.6 | 6.8 | 71.2 | 0.80 | 21.7 | 6 | 65.5 | 0.87 |
| Stomachs | 19.1 | 11.1 | 65 | 1 | 18 | 11.3 | 66 | 0.97 | 20.6 | 8.5 | 69 | 0.93 | 20.25 | 9.2 | 67.5 | 0.90 |
| Livers | | | 38.2 | | | | 38.2 | | | | 52.6 | | | | 51.2 | |

| | Mice receiving feed No. 4 (lot No. 4) | | | | Mice receiving feed No. 5 (lot No. 5) killed on the 9/9 | | | | Mice having received feed No. 5 (lot 5 bis) up to the 9/9, then feed 4c | | | | Mice receiving feed No. 6 (lot No. 6) | | | |
|---|---|---|---|---|---|---|---|---|---|---|---|---|---|---|---|---|
| | Percent D.M. | Mg. of free amino acids per g. of D.M. | Percent proteins D.M. | Percent total phosphorus D.M. | Percent D.M. | Mg. of free amino acids per g. of D.M. | Percent proteins D.M. | Percent total phosphorus D.M. | Percent D.M. | Mg. of free amino acids per g. of D.M. | Percent proteins D.M. | Percent total phosphorus D.M. | Percent D.M. | Mg. of free amino acids per g. of D.M. | Percent proteins D.M. | Percent total phosphorus D.M. |
| Livers | 27.7 | 4.7 | 78.4 | 0.91 | 22.6 | 11.7 | 66.2 | 0.91 | 24.5 | 9.7 | 70.6 | 0.81 | 27.3 | 5.9 | 69.9 | 1.4 |
| Spleens | 22.1 | 6 | 80.6 | 1.66 | 21.8 | 6.6 | 80 | 1.44 | 22.6 | 5.7 | 75.5 | 1.47 | 22 | 5.4 | 74 | 1.6 |
| Kidneys | 26.2 | 4.6 | 61.6 | 1.07 | 22.2 | 5.6 | 79 | 0.51 | 25 | 5.2 | 60.2 | 0.94 | 25.9 | 6.1 | 59.5 | 0.9 |
| Brains | 19.8 | 7.6 | 55 | 1.37 | 17.4 | 10.4 | 60 | 1.03 | 19.2 | 8.4 | 54.8 | 1.39 | 19.9 | 8.9 | 55.2 | 1.4 |
| Intestines | 20.1 | 13.3 | 73.6 | 1.35 | 17.7 | 18.7 | 71.2 | 1.3 | 19 | 15.8 | 70 | 1.25 | 20 | 13.6 | 71.2 | 1.6 |
| Skins and fur | 47.9 | 2.1 | 47.9 | 0.11 | 47.6 | 3 | 54.8 | 0.13 | 44 | 2.5 | 51.6 | 0.12 | 48.7 | 2.1 | 47.1 | 0.2 |
| Muscles | 29 | 3.2 | 62.4 | 1.35 | 29.65 | 4.6 | 55.6 | 0.50 | 29.25 | | 59.4 | 0.51 | 28.7 | 3.6 | 62.3 | 0.2 |
| Bones | 44.6 | 4 | 45.8 | 0.89 | 36.9 | 2.5 | 61.2 | 6.4 | 42.4 | 2.4 | 47 | 7.5 | 44 | 2.4 | 48.3 | 8.6 |
| Lungs | 19.1 | 5.8 | 73 | 7.6 | 20.5 | 6.5 | 78 | 0.87 | 19.1 | 5.2 | 64 | 0.87 | 19.8 | 6 | 68 | 8.9 |
| Hearts | 22.8 | 5.8 | 75 | 0.85 | 21.5 | 7.8 | 80 | 0.75 | 21.2 | 5.8 | 69 | 0.8 | 22.3 | 5.3 | 72 | 0.8 |
| Stomachs | 21.5 | 8.6 | 71.5 | 0.84 | 21 | 11.6 | 76 | 0.95 | 19.5 | 8.8 | 67 | 0.9 | 19.8 | 9.3 | 68.5 | 1 |
| Livers | | | 33.3 | | | | 72 | | | | 49.5 | | | | 38.4 | |

Mg. of glucose per g. of D.M. 52.6

An increase in proteins was found in all the organs of lot No. 5, except in muscle where their level is lower. It is interesting to note that lots 2 and 3 occupy intermediate positions.

The total phosphorous contents in the organs of lot No. 5 were very low. A decrease in this element was also observed in lots 2 and 3; notably in the bones.

Free hepatic glucose was very much increased in mice of lots No. 2, 3 and 5. This phenomenon could be caused by an inhibition of phosphorylation.

Results of analyses of the mice of lot 5 bis show that the disturbances observed in lot No. 5 are rapidly reversible when the diet is altered.

Analyses of lot No. 6 indicate that macerated colza cake with the cellulose removed is an excellent foodstuff for mice.

(F) Conclusions

The preceding results show clearly that the subjecting colza cakes to maceration in the presence of a stain of *Geotrichum candidum* the food value of these cakes is improved.

Yeast acts in at least two ways: on the one hand, hydrolysis of thioglycosides with breakdown of the isothiocyanates formed is observed; on the other, there is freeing, followed by destruction, of toxic heteroprotein compounds.

The fraction precipitating at 20% of $SO_4(NH_4)_2$ (protein α) administered to the mouse by mouth stops its growth at a dose of 20 mg./kg.

By continuing fermentation, complete solubilization of colza proteins is observed, which can easily be leached out by conventional chemical methods. The fractions thus obtained contain between 65 and 80% proteins and are suitable for texturization.

The overall composition of these fractions in amino acids remains substantially the same as in the original cake. It is, however, possible to isolate a protein (protein β) which accounts for 25% of the total proteins and which possesses a very special structure and properties.

Nutritional experiments carried out on the mouse showed that colza cake is not toxic to the mouse in as far as can be ascertained by weight measurements. However, by the many analyses carried out on organs, major disturbances are found in the amino acids, free glucose, proteins and phosphates in the case of mice fed with colza cake containing large amounts of thioglycosides, and Polish cake which does not contain any.

In short, the results of detailed experiments given hereinabove clearly show that maceration of colza cake with *Geotrichum candidum* markedly improves the balance of amino acids and the food value of colza cake, in the case of mice, for instance.

EXAMPLE 2

The process for macerating colza cake was applied to groundnut cake.

Operating under the same conditions as those described with respect to colza cake, groundnut cakes were detoxified by destroying the aflatoxins they contain.

Maceration with *Geotrichum candidum* was carried out on three batches of badly polluted groundnut cakes. Table IV below shows the evaluation of the breakdown of aflatoxins with time.

TABLE IV

The evolution of the breakdown of aflatoxins in groundnut cakes macerated with *Geotrichum candidum*

| Maceration time (h.): | Aflatoxins (mcg./kg. of cake) | | |
|---|---|---|---|
| | Lot No. 1 | Lot No. 2 | Lot No. 3 |
| 0 | 230 | 190 | 150 |
| 8 | 110 | 115 | 80 |
| 15 | 50 | 37 | 32 |
| 24 | 17 | 11 | 6 |
| 36 | 0 | 0 | 0 |
| 48 | 0 | 0 | 0 |

The results given above in Table IV show that toxic compounds disappear completely after 36 h. of maceration. The balance of amino acids and the nutritive value of groundnut cakes are, therefore, markedly improved by the treatment of the invention.

EXAMPLE 3

Soya cakes were subjected to maceration conditions with *Geotrichum candidum* in order to improve the nitrogen efficiency of soya proteins. The results obtained were studied in nutritional trials on the mouse.

Two lots of 40 female mice were formed. The control lot received feed No. 1 defined in Table II of Example 1; the second lot received the same feed in which the traditional soya cake was replaced by macerated soya cake. The results are given in FIG. 6.

FIG. 6 is a graph on which the weight increase of the mice, expressed in g., is shown in ordinates as a function of time expressed in weeks. The upper curve corresponds to feeding with soya cake macerated according to the invention, whereas the lower curve corresponds to normal feeding (feed No. 1). The figure clearly shows that the growth of mice is better with the macerated soya cake.

The amino acid composition of the proteins appears to differ very little in the two batches of soya, so it would seem that the greater nitrogen efficiency of the macerated cake is due to the breakdown of the thioglycosides and a profound modification of the carbohydrates, certain constituents of which act as antimetaboles and enzyme inhibitors.

The invention has only been illustrated by the preceding, nonlimiting examples. It should, indeed, be noted that the process of treatment by biological means is applicable to cakes of any vegetable origin.

What is claimed is:

1. Process for removing toxic substances from cake obtained from vegetable seeds comprising contacting the cakes in maceration condition in an aqueous medium with the microorganism *Geotrichum candidum* at a temperature and for a time sufficient for removal of the toxic substances from the cake and thereafter separating the cake from the aqueous medium.

2. Process according to claim 1, the temperature being about 30 to 45° C.

3. Process according to claim 1, the pH during said contacting being about 4–6.5.

4. Process according to claim 2, the pH during said contacting being about 4–6.5.

5. Process according to claim 1, the temperature being about 30° C., the time being about 30–40 hours.

6. The process of claim 1 wherein the cakes are selected from cakes made of colza and rape, groundnut, sunflower, soya, sesame, castor oil, cotton, vinia sinensis, and broad bean (*Faba vulgaris*).

7. The process of claim 10 wherein the temperature of treatment is in the range of about 30 to 45° C.

8. The process of claim 1 in which the contacting temperature is in the range of about 37 to 40° C.

9. The process of claim 1 in which the pH of the treatment medium varies between about 4 to 6.5.

10. The process of claim 1 in which the treatment is continued until the sulphur-containing impurities contaminating the starting cake are eliminated.

11. The process of claim 1 in which the treatment is continued until the extraction of proteins of the starting cakes and substantially complete solubilization of said proteins in the treatment medium occurs.

12. The process of claim 1 which comprises the additional stage of isolation of pure proteins solubilized in the said separated aqueous medium by the addition of aqueous solutions of inorganic salts or of organic solvents, and separation of the precipitated protein fractions.

13. The process of claim 12 in which the inorganic salt is ammonium sulphate.

14. The process of claim 12 in which the treated cake is colza cake and where aqueous solutions of ammonium sulphate at 20% and 40% are used successively in order to isolate the protein fractions.

References Cited

UNITED STATES PATENTS

| 2,960,408 | 11/1960 | Geister et al. | 99—9 |
| 2,516,128 | 7/1950 | Breton et al. | 195—4 |
| 3,635,726 | 1/1972 | Sair | 99—17 |
| 2,607,768 | 8/1952 | McCready | 260—123.5 |

LIONEL M. SHAPIRO, Primary Examiner

UNITED STATES PATENT OFFICE
CERTIFICATE OF CORRECTION

Patent No. 3,803,328　　　　　　　　　　Dated April 9, 1974

Inventor(s) Thadee Joseph Staron

It is certified that error appears in the above-identified patent and that said Letters Patent are hereby corrected as shown below:

Col. 3, line 23, change "100 ml." to --1000 ml.--

Col. 5, line 9, cancel "$SO_4 (NH_4)_2$".

Col. 5, line 17, change "trytophan" to --tryptophanne--.

Table 1, the first entry, after "Protein content" insert --in % by dry weight--

Table I, the first entry, last column (Protein ß), change "10" to --100--.

Signed and sealed this 28th day of January 1975.

(SEAL)
Attest:

McCOY M. GIBSON JR.　　　　　　　　C. MARSHALL DANN
Attesting Officer　　　　　　　　　　Commissioner of Patents